Dec. 23, 1969  E. H. KRUGER  3,485,415

METERING DEVICE FOR MIXER

Filed Nov. 27, 1967  2 Sheets-Sheet 1

ELMER H KRUGER
INVENTOR.

BY *Lucas J. D Foster*
HIS ATT'Y

United States Patent Office 3,485,415
Patented Dec. 23, 1969

3,485,415
METERING DEVICE FOR MIXER
Elmer H. Kruger, 4061 Barnar Drive,
Luverne, Minn. 56156
Filed Nov. 27, 1967, Ser. No. 685,911
Int. Cl. B67d 5/60; G01f 11/06
U.S. Cl. 222—132                5 Claims

ABSTRACT OF THE DISCLOSURE

A metering device for a mixer of dry particulate material. The metering is accomplished by raking the material from the base of a hopper into a blending chamber. The stroke of the rake is adjustable and its form is unique allowing a very fine adjustment in the amount of material delivered.

---

This invention pertains to mixers of particulate material such as livestock feed, and more particularly to a mixer in which the amounts of each type of material may be varied and adjusted to a fine degree of accuracy.

Feed for livestock is ordinarily a blend of numerous ingredients. These may include various grains, as a basis for the feed, blended with protein materials, minerals and the like. The proportion of these materials may well vary with different types of grain, and sometimes with differing varieties of the same grain. Also the proportion will vary according to the type of livestock to be fed, the age of the livestock (whether very young or mature) and the purpose of the livestock (whether meat animal, dairy or breeding stock). Thus, a wide variety of different mixtures of feed may be necessary.

Such mixtures may be made at a central factory. However, because of the wide variety required, and because of the large bulk of grain is commonly produced near the point of use of the feed, it is more common practice to mix the feed ingredients at the delivery point. The need for a moderate size mixer will now be apparent.

The great difference in the quantity of ingredients necessary to make proper proportions in the feed produces an additional problem. While large quantities of grain are used, only a very small quantity of mineral material may be desired. Therefore a wide difference in quantity delivery is important. Furthermore, accuracy is important because of the relative potency of the material. These problems have, in the past, been met by machinery which has required complex operations to make the necessary adjustments for the wide variety of proportions necessary.

By my invention, I provide a machine which can accept materials from a plurality of hoppers, deliver accurately proportioned amounts of the materials to a mixing chamber and be readily adjustable to vary the proportions over a wide range of values. This I do by providing a unique sliding rake which rakes the material from the base of the hopper into the mixing chamber and which is moved through a stroke which may be adjusted to provide adjustments in the amount of material delivered.

Figure 1:
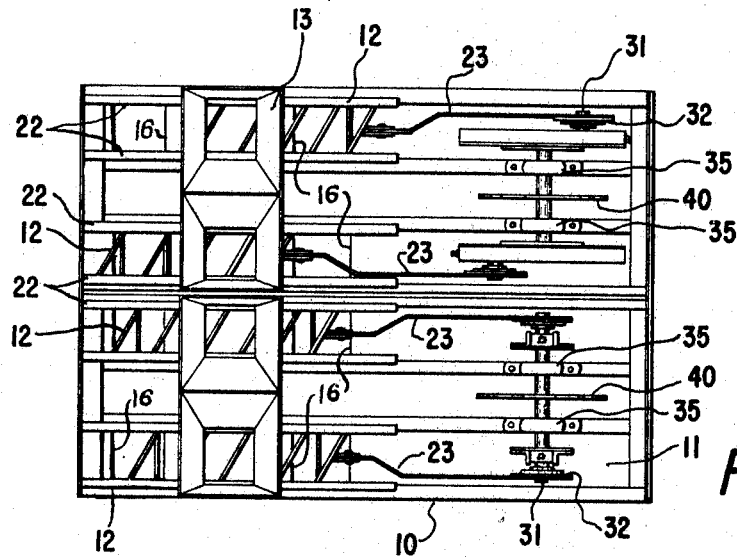
Figure 2:
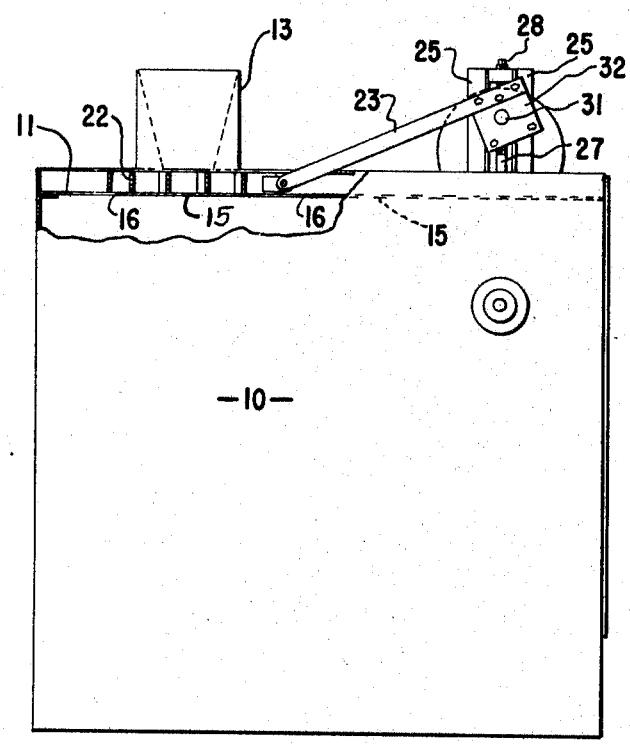
Figure 3:
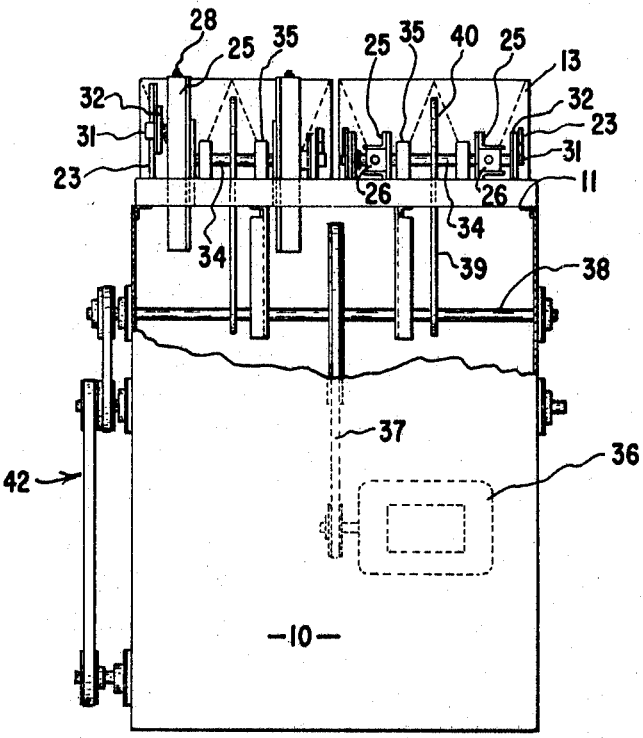
Figure 4:
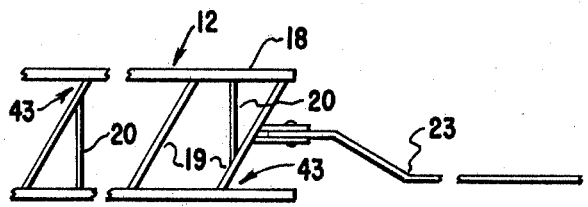
Figure 5:
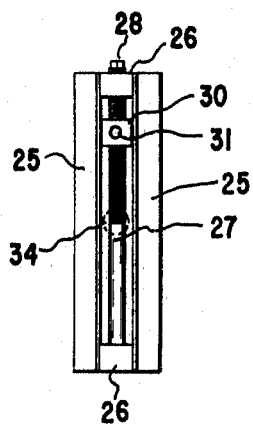

A more complete understanding of my invention in its embodiment may be had from a study of the following specification and the figures in which:

FIG. 1 is a top plan view of my device,
FIG. 2 is a side elevational view of the device,
FIG. 3 is an end elevational view with parts of the end cover broken away to show the underlying mechanism.
FIG. 4 is a top plan view of the rake removed from the device and to an enlarged scale, and
FIG. 5 is an elevational view of the adjustable crank mechanism removed from the machine.

Briefly my invention comprises a mixer having a mixing chamber or a grinder which receives various proportions of materials to be blended into livestock feed or the like. The ingredient materials are delivered to the chamber by unique rakes having diagonal dividers. The stroke of the rake is infinitely variable to provide a wide range of adjustment simply and easily.

More specifically and with reference to the drawings, my device comprises a box-like chamber 10 in which the material may be mixed by any conventional means or through which the material may be delivered to a grinder or mill in which the materials are both ground and mixed. On the upper surface 11 of the box are slidably mounted a plurality of rakes 12. These rakes are slidable from a fully extended position through a neutral position to a fully retracted position.

At the neutral or receiving position of each rake 12, it is positioned directly beneath the discharge end 13 of a chute which will deliver material to the rake. Beneath the rake, the chamber 10 is formed with a closed upper wall 15 which prevents the material from passing through the rake and into the chamber. Openings 16 in the upper wall 15 are provided positioned so that when the rake moves from its neutral position toward either of the deliver positions, which may be called to the retracted or extended positions, any material can drop from the rake into the mixing chamber or to passages enclosed therein. Thus, the rake can deliver material from the end 13 of the chute to the chamber 10 simply by sliding back and forth beneath the chute.

In order to provide for finer adjustments of the quantity of material delivered, I form my rake in a somewhat unique form shown best in FIG. 4. Actually, the basic rake consists of two parallel side walls 18 spaced apart slightly more than the width of the discharge end 13 of the chute. A series of cross members 19 holds the side walls together. These cross members are diagonally disposed for reasons to be made clear hereinafter. Near each end of the rake, at a position defined by the motion thereof, I provide for cut-off walls 20 which are substantially perpendicular to the side walls 18.

The rakes 12 are slidably disposed in tracks 22 mounted on the upper wall 15. Motion is transmitted to each rake through a pitman 23 pivotally connected to the rake. The tracks are sufficiently long to allow the rake to move to either the extended or retracted position.

Movement of the rakes is induced by a novel adjustable crank mechanism. This crank is best shown apart from its associated mechanism in FIG. 5. Essentially, the crank is a framework having two side members 25 held together by two end members 26. A screw member 27 is journalled in the two end members 26 about midway between the sides. One end of the screw extends through the end member and terminates in a tang 28 which may be of hexagonal or square shape for engagement by a mating wrench (not shown). A slide member 30 is slidably disposed between the sides 25 and adapted to slide thereon. It is also threaded onto the screw 27 so that it can be adjusted longitudinally of the crank. A shaft 31 on the slide is journalled in a bearing 32 on the pitman 23 to complete the crank and pitman arrangement.

The entire crank is mounted to be driven by a shaft 34. This shaft is attached to the sides 25 of the crank and may be used to connect a pair of adjacent cranks as shown in FIGS. 1 and 3. The shaft is journalled in bearings 35 on the upper surface 11.

The power to the cranks is provided by a motor 36 which may be mounted on the wall of the chamber 10 or any other convenient location. The power may be transmitted by means of a belt 37 to an idler shaft 38 journalled on the walls of the chamber 10. From the idler shaft, power is transmitted to the cranks by means of a belt and pulley or chain 39 and sprocket 40 to the shaft 34. Auxiliary drives 42 for a grinder or mixer may also be provided to receive power from the idler shaft 38.

In operation, my device is adapted to receive grains, minerals, protein concentrates and the like from bins connected to the metering device through chutes to the ends 13. At this point the material is fed by gravity into the divisions of the rakes. If no material is to be delivered from any of the chutes, that rake is immobilized simply by adjusting the screw 27 of the corresponding crank so that the slide 30 is at the center of rotation of the shaft 34. In this position, the shaft 31 will be aligned with shaft 34 and the crank will not operate resulting in no motion of the rake.

If the maximum delivery is desired of another material, the slide is adjusted to its outermost position in which the throw of the crank will be greatest. In that position, the shaft 31 describes an arc of greatest radius around the shaft 34 resulting in maximum motion of the rake. The rake will then carry a full amount of material from the chute to an opening 16 at each end of the stroke through which the material will drop into a mixer or a grinder where it will be blended with other materials.

To provide for intermediate amounts of material, it is obvious that the crank can be adjusted to any intermediate position. However, one other feature of my invention is not so obvious. This is its provision for the delivery of very minute proportions of material. Minerals, for example, may be a very small proportion of the final bulk, yet I can provide correct proportions even of such material. This is possible because of the diagonal positions of the cross members or dividers 19 and the perpendicular position of the cut-off walls 20. These walls 20 are positioned so that a small amount of material may fall into the next outward chamber 43 beyond the cross wall at a minimum motion of the slide. Preferably, the space between the cross wall 20, and the intersecting divider 19 and sidewall 18 is covered or filled in. Therefore, only a minute amount of material will drop into the triangular chamber 43. This amount will be moved across the surface 11 toward the opening 16. Because of the small motion of the slide for minimum delivery, the material will not be delivered to the opening on its first stroke after a cleaning, but the material will fill up the gap and eventually, this small amount will be delivered at each stroke. Thus, the adjustable crank can be adjusted to provide for delivery of a great range of amounts of materials which may be necessary for proper mixing of feeds.

Having thus described my invention in its embodiment, I am aware that numerous and extensive departures may be made therefrom without departing from the spirit and scope of the invention as limited only by the following claims.

I claim:
1. Rake means adapted to slide beneath a chute for a metering device comprising a pair of parallel side walls, cross members connected between said side walls, said cross members being disposed in diagonal relationship to said side walls and cut off walls perpendicular to said side walls disposed between an adjacent side wall and the cross member at each end of said rake means.

2. The device of claim 1 in which each of said cut-off walls is disposed at a position such that if extended, it would leave a triangular space between the side wall opposite that to which it is attached and the cross member, into which space a small amount of material may be delivered when said cut-off wall is positioned beneath the edge of said chute.

3. A metering device comprising a chamber having an upper surface, rake means disposed on said surface and slidable between a receiving position and at least one delivery position, said rake means being formed of parallel side walls, cross members diagonally disposed between side walls, control means for said rake means including a crank means connected to said rake means, said crank means having an adjustable stroke, the combination of which with the diagonal cross members providing for variable delivery of material from said receiving position to said chamber.

4. The device of claim 3 in which cut-off walls perpendicular to said walls are engaged between an adjacent side wall and the cross member at each end of said rake means and are positioned so that if extended, said cut-off wall would form a triangular space between it, the side wall opposite that to which it is attached and the outer surface of the cross member to which it is attached.

5. The device of claim 4 in which a plurality of said rake means are disposed on said upper surface, drive means on said chamber adapted to drive all of said crank means and drivingly connected to driving means for alternate devices in said chamber.

References Cited

UNITED STATES PATENTS

| | | | |
|---|---|---|---|
| 513,940 | 1/1894 | Kelly | 222—361 |
| 1,795,312 | 3/1931 | Mojonnier et al. | 222—309 X |
| 1,964,028 | 6/1934 | Boynton et al. | 222—134 X |
| 1,968,641 | 7/1934 | Grieg | 222—361 X |
| 2,176,562 | 10/1939 | Rose | 222—284 X |
| 2,983,408 | 5/1961 | Schwartz | 222—284 |
| 3,149,753 | 9/1964 | Forsyth | 222—309 X |
| 879,423 | 2/1908 | Sturtevant et al. | 222—409 X |
| 2,726,791 | 12/1955 | Thompson | 222—287 X |

ROBERT B. REEVES, Primary Examiner

H. S. LANE, Assistant Examiner

U.S. Cl. X.R.

222—134, 284, 309